US012043342B2

(12) United States Patent
Southall

(10) Patent No.: US 12,043,342 B2
(45) Date of Patent: Jul. 23, 2024

(54) DISC BRAKE CALIPER LOCATION ON A RIGID BICYCLE FORK

(71) Applicant: Timothy Southall, Clarence Park (AU)

(72) Inventor: Timothy Southall, Clarence Park (AU)

( * ) Notice: Subject to any disclaimer, the term of this patent is extended or adjusted under 35 U.S.C. 154(b) by 348 days.

(21) Appl. No.: 17/439,729

(22) PCT Filed: Mar. 12, 2020

(86) PCT No.: PCT/AU2020/050232
§ 371 (c)(1),
(2) Date: Sep. 15, 2021

(87) PCT Pub. No.: WO2020/186289
PCT Pub. Date: Sep. 24, 2020

(65) Prior Publication Data
US 2022/0153382 A1    May 19, 2022

(30) Foreign Application Priority Data

Mar. 15, 2019 (AU) ................ 2019900869

(51) Int. Cl.
| | |
|---|---|
| *F16D 65/12* | (2006.01) |
| *B62L 1/00* | (2006.01) |
| *B62L 1/02* | (2006.01) |
| *F16D 65/00* | (2006.01) |
| *F16D 65/847* | (2006.01) |
| *F16D 55/00* | (2006.01) |
| *F16D 65/02* | (2006.01) |

(52) U.S. Cl.
CPC ................ *B62L 1/02* (2013.01); *B62L 1/005* (2013.01); *F16D 65/0062* (2013.01); *F16D 65/847* (2013.01); *F16D 2055/0012* (2013.01); *F16D 2055/0016* (2013.01); *F16D 2065/1388* (2013.01)

(58) Field of Classification Search
CPC ........ B62L 1/005; B62L 1/02; F16D 65/0062; F16D 65/847
USPC ............ 188/24.11–24.22; 280/275, 276, 279
See application file for complete search history.

(56) References Cited

U.S. PATENT DOCUMENTS

| | | | |
|---|---|---|---|
| 5,259,483 A | * | 11/1993 | Pelfrey .................... F16D 65/18 188/73.46 |
| 2002/0079670 A1 | | 6/2002 | Yih |
| 2008/0000729 A1 | | 1/2008 | Takizawa |
| 2012/0032413 A1 | | 2/2012 | Bell et al. |
| (Continued) | | | |

FOREIGN PATENT DOCUMENTS

GB        1274412 A      5/1972

OTHER PUBLICATIONS

PCT/AU2020/050232. International Search Report & Written Opinion (Jun. 10, 2020).

*Primary Examiner* — Christopher P Schwartz
(74) *Attorney, Agent, or Firm* — LOZA & LOZA, LLP; Heidi Eisenhut

(57) ABSTRACT

The present disclosure relates to the positioning of a disc brake caliper mounted to a rigid bicycle fork. In one aspect, the disc brake caliper is attached to a portion in front of the fork and the front wheel axle, hence exposing the disc brake caliper to the maximum cooling potential of the airflow. Further, the disc brake caliper is positioned roughly horizontally in-line with the wheel axle to provide aerodynamic benefits for the trailing front wheel axle.

6 Claims, 3 Drawing Sheets

(56) References Cited

U.S. PATENT DOCUMENTS

| | | | |
|---|---|---|---|
| 2014/0265225 A1* | 9/2014 | D'Aluisio | B62K 21/02 280/276 |
| 2022/0153382 A1* | 5/2022 | Southall | F16D 65/0062 |
| 2022/0169332 A1* | 6/2022 | Southall | B62L 1/00 |

* cited by examiner

DISC BRAKE CALIPER LOCATION ON A RIGID BICYCLE FORK

PRIORITY DOCUMENTS

The present application claim priority from:
Australian Provisional Patent Application No 2019900869 titled "DISC BRAKE CALIPER LOCATION ON A RIGID BICYCLE FORK" and filed on 15 Mar. 2019

TECHNICAL FIELD

The present disclosure relates to the location of a disc brake caliper fixedly connected to a rigid bicycle fork, and the relationship of the disc brake caliper location to the aerodynamic and braking performance of the rigid bicycle fork. In a particular form the present disclosure relates to a disc brake caliper fixedly mounted to a portion of the rigid bicycle fork in a location that allows for the maximum cooling of the disc brake caliper, and optimised aerodynamic benefits for the axle of the front wheel. The front wheel axle is positioned in the aerodynamic slip stream of the disc brake caliper. The disc brake caliper is located forward of the wheel axle and fork.

BACKGROUND

Disc brakes are largely favoured to provide braking duties on high performance vehicles including bicycles due to their consistent performance in diverse environmental conditions, their power and modulation, and ability to disperse unwanted heat. On the front fork of a bicycle, the disc brake caliper/s are typically attached to a portion of the bicycle fork that is not in line with the axle of the front wheel and offers no aerodynamic advantage to the area of the front wheel axle. Furthermore, the location of the disc brake caliper typically adds unwanted aerodynamic drag to the bicycle, and the disc brake caliper is located where it is not exposed to the maximum cooling potential of the passing air. Exposing the disc brake caliper to the maximum cooling potential of the passing air is advantageous to the braking performance of the bicycle, improving the safety, control, and confidence of the rider. Reducing aerodynamic drag of the bicycle is advantageous to increasing riding speed and efficiency.

Since the introduction of disc brakes to bicycles, the disc brake calipers have always been mounted rearward of the bicycle fork, and well above the line of the wheel axle. The disadvantages of this arrangement are well known and various solutions have been tried to improve the system. For example, special fenders or fins have been developed to direct more air onto the disc brake caliper to enhance the cooling of the caliper. This is a response to the caliper not being optimally located to receive the full cooling airflow. The downsides to this solution are increased aerodynamic drag, and increased complexity. Another recent development is that of placing fenders on the sides of the disc brake caliper to direct air around the caliper with less generated turbulence. This improves the aerodynamics of the region around the brake caliper but significantly reduces the calipers ability to disperse unwanted heat because less cooling airflow makes contact with the caliper. Complexity and cost are likewise increased.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect of the present invention, there is provided a disc brake equipped rigid bicycle fork. Comprising a rigid bicycle fork and a disc brake caliper fixedly connected to a portion of the rigid bicycle fork. The disc brake caliper is positioned forward of the front wheel axle and forward of the rigid bicycle fork. Further, the disc brake caliper is fixedly attached to a portion of the fork wherein the uppermost portion of the disc brake caliper is above the wheel axle on the horizontal plane, and the bottommost portion of the disc brake caliper is below the wheel axle on the horizontal plane.

In one form, the disc brake caliper is located forward of the rigid bicycle fork, and wheel axle for maximum cooling of the brake caliper by the passing airflow.

In one form, the disc brake caliper is located forward of the rigid bicycle fork, and wheel axle in a position to provide maximum aerodynamic advantage to other parts of the bicycle including the front wheel axle, front wheel hub, disc brake rotor bolts, and lower portion of the rigid bicycle fork.

In one form, the bicycle fork is rigid.

In one form, the lower portion of the bicycle fork is somewhat flexible, for absorbing minor vibrations caused by the bicycle passing over uneven terrain.

In one form the disc brake caliper is attached to the bicycle fork at a location essentially horizontally in line with the wheel axle.

In one form the bicycle fork is one sided.

In one form the bicycle fork is has two sides bracing over the wheel and supporting the wheel from both sides about the wheel axle.

For ease of description, disc brake equipped rigid bicycle forks embodying the various aspects of the present invention are described below in their usual assembled position as shown in the accompanying drawings and terms such as front, rear, upper, lower, horizontal, longitudinal etc., may be used with reference to this usual position. However, the disc brake equipped rigid bicycle forks may be manufactured, transported, sold, or used in orientations other than that described and shown here.

A detailed description of one or more embodiments of the invention is provided below along with accompanying Figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein.

In the following description, like reference characters designate like or corresponding parts throughout the Figures.

DESCRIPTION OF EMBODIMENTS

A conventional disc brake equipped rigid bicycle fork typically has the disc brake caliper located in such a position that it not exposed to the full cooling potential of the wind. Typically, the disc brake caliper is located behind the bicycle fork, wherein the bicycle fork obstructs much of the wind from flowing directly over the brake caliper. Braking performance is therefore negatively impacted in situations where a high generation of heat occurs due to hard prolonged braking.

For the purpose of this specification, the term "disc brake caliper" should be construed as being inclusive of any member whose primary function is to provide braking forces by squeezing brake pads on the disc brake rotor, causing friction that converts the kinetic forward momentum into heat, thus slowing the bicycle.

For the purpose of this specification, the term "disc brake rotor" should be construed as being inclusive of any member whose axis of rotation is fixedly connected to the wheel, and whose primary function is to provide a surface unto which the disc brake caliper and brake pads can squeeze onto, the generated friction converting the forward momentum of the vehicle into heat, thus slowing the bicycle.

For the purpose of this specification, the term "rigid bicycle fork" and "bicycle fork", and "fork" should be construed as being inclusive of any member whose primary function is to hold and provide a rotable connection to the front wheel, and a pivotal connection to the bicycle frame. Enabling steering of the bicycle and rotation of the wheel. Furthermore, the term "rigid" should be construed as referring to a bicycle fork that has no pivot points, and is designed to have less than 10 mm of vertical compliance—measured at the wheel axle, when encountering bumps on a road.

For the purpose of this specification, the term "front wheel axle" and "wheel axle" should be construed as being inclusive of the axle of the front wheel only. The centre-point of the front wheel, about which the wheel rotates.

Figure 1:
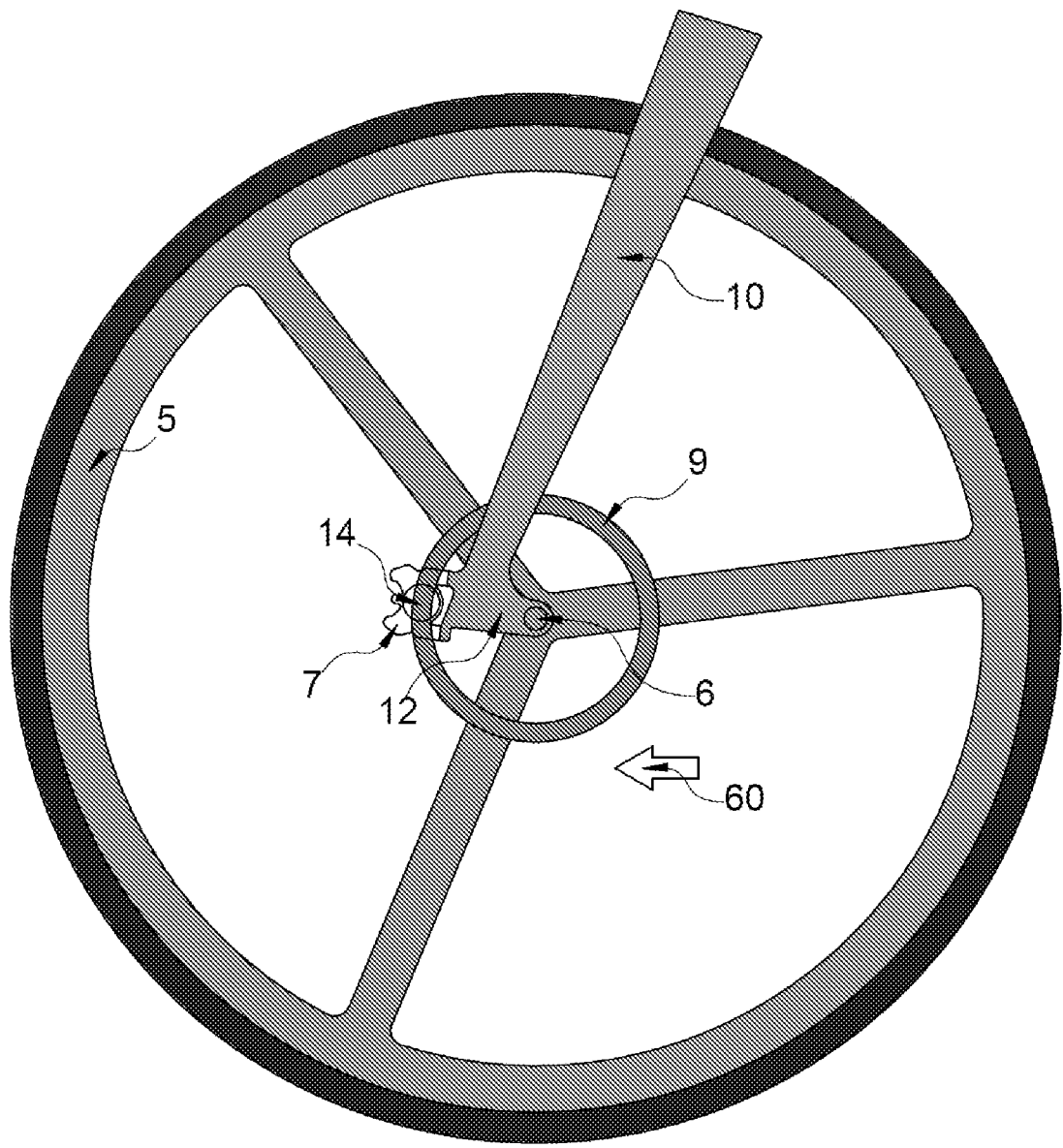
FIG. 1 is a schematic representation of a disc brake equipped rigid bicycle fork wherein the brake caliper is mounted forward of the bicycle fork and axle. Front wheel is illustrated.

Referring now to FIG. 1, there is shown a schematic representation of a rigid bicycle fork 10 with a disc brake caliper 7 fixedly attached to the bicycle fork 10. The centre-point of the disc brake caliper position 14 is shown, according to an embodiment of the present invention. Position 14 for the caliper 7 is favourable in exposing the caliper 7 to the maximum unobstructed airflow to cool the caliper 7, enhancing braking performance. The wheel 5 and disc brake rotor 9 rotate about its axle 6 as the bicycle travels in the forward direction 60. The trailing section 12 of the bicycle fork 10 is here depicted in a form favourable for obtaining high strength to weight, and high stiffness to weight ratios.

Figure 2:
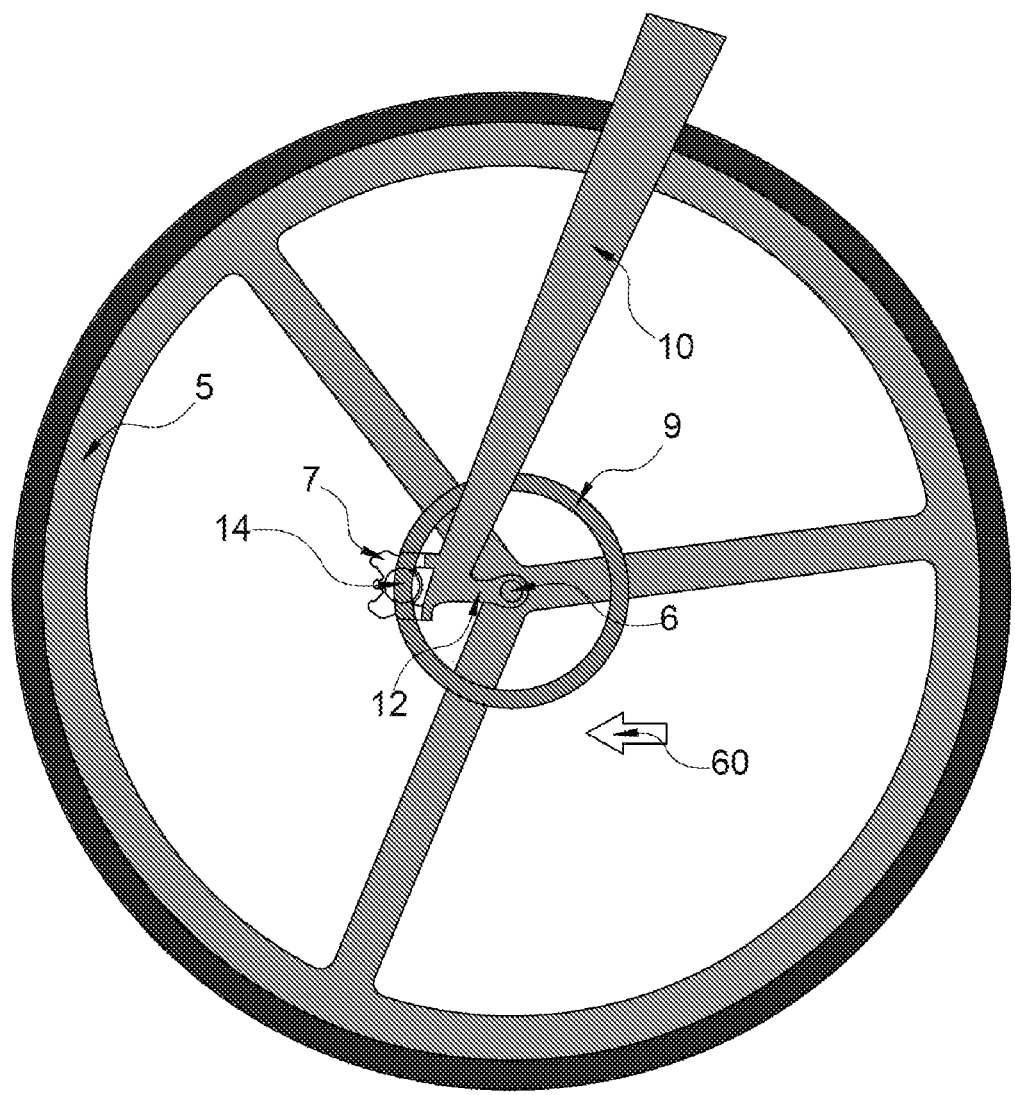
FIG. 2 is a schematic representation of a disc brake equipped rigid bicycle fork wherein the brake caliper is mounted forward of the bicycle fork and axle. The lower portion of the bicycle fork is of the type designed to provide some vertical compliance when encountering bumps.
Figure 3:
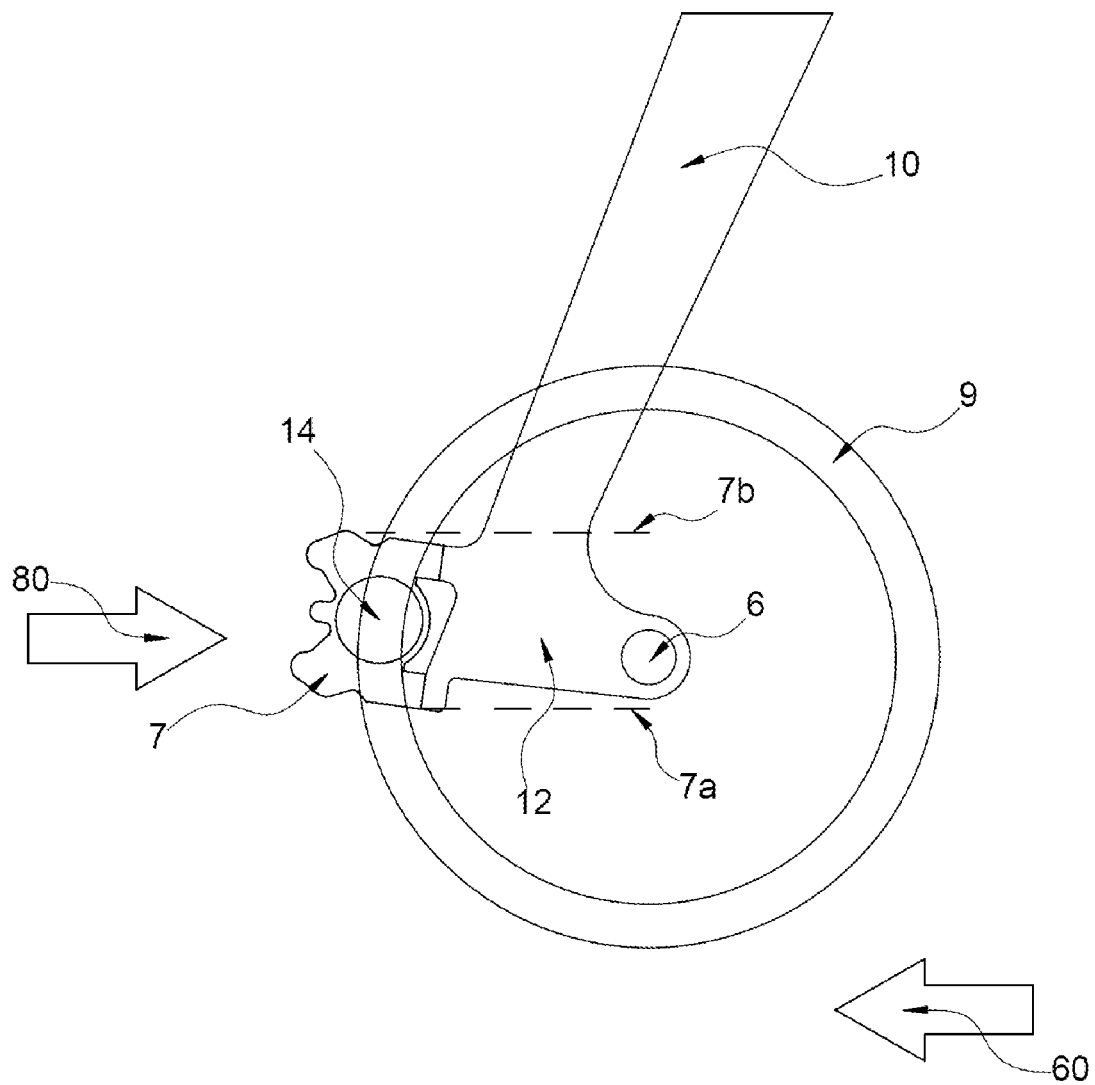
FIG. 3 is a schematic representation of a disc brake equipped rigid bicycle fork wherein the brake caliper is mounted forward of the bicycle fork and axle. Oncoming airflow direction as the bicycle travels forward is illustrated, as is the zone of aerodynamic benefit to the wheel axle in the slipstream of the brake caliper.

It is to be noted that for the embodiments shown in FIGS. 1-3, only the left side of the disc brake equipped bicycle fork 10 is illustrated and described. In certain embodiments the right side of the bicycle fork 10 may be substantially identical to the left side, or it may be dissimilar. In certain embodiments, the bicycle fork may be one sided.

Referring now to FIG. 2, there is shown a schematic representation of a rigid bicycle fork 10 with a disc brake caliper 7 fixedly attached to the bicycle fork 10. The centre-point of the disc brake caliper position 14 is shown, according to an embodiment of the present invention. The trailing section 12 of the bicycle fork 10 is here depicted in a form favourable for obtaining some flex in the vertical plane which is favourable for absorbing small bumps and vibrations as the bicycle passes over uneven surfaces.

Referring now to FIG. 3, there is shown a schematic representation of a rigid bicycle fork 10 with a disc brake caliper 7 fixedly attached to the bicycle fork 10. The centre-point of the disc brake caliper position 14 is shown, according to an embodiment of the invention. The direction of travel of the bicycle is indicated by arrow 60. The direction of travel of the incoming air as the bicycle travels forwards is indicated by arrow 80. The zone of potential aerodynamic benefit to the wheel axle 6 exists between the dotted lines 7a and 7b. Between the dotted line 7a and dotted line 7b is the slipstream from the disc brake caliper 7. Dotted line 7a corresponds to the bottommost point of the disc brake caliper 7. Dotted line 7b corresponds to the uppermost point of the disc brake caliper 7. In FIG. 1, FIG. 2, and FIG. 3 the disc brake caliper is positioned such that the wheel axle 6 is located between the horizontal plane of 7a and 7b for maximum aerodynamic benefit. The unexpected result of locating the disc brake caliper 7 at position 14 is that not only is braking performance improved due to the optimal exposure of the caliper 7 to cooling airflow, but the aerodynamics of the complete system taken as a whole, including the fork 10, wheel 5, brake caliper 7, and wheel axle 6, is greatly improved.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A front fork assembly for a bicycle, the bicycle having a frame and a front wheel rotatably connected via a front wheel axis, the front fork assembly comprising:
   a rigid front fork connected to the frame for supporting the front wheel;

a brake disc operatively connected to the front wheel for decelerating or stopping the bicycle; and a brake disc caliper fixedly mounted on the rigid front fork forward of the wheel axle; and wherein an uppermost portion of the brake disc caliper is located above an axis of the wheel axle in a horizontal plane and a bottommost portion of the brake disc caliper is located below the axis of the wheel axle in the horizontal plane.

2. The front fork assembly for a bicycle of claim 1, wherein the rigid front fork is designed to have less than 5 mm of vertical compliance measured at the wheel axle when encountering bumps.

3. The front fork assembly for a bicycle of claim 1, wherein the rigid front fork is designed to have 5-10 mm of vertical compliance measured at the wheel axle when encountering bumps.

4. The front fork assembly for a bicycle of claim 1, wherein the rigid front fork has a degree of flexing between 5-10 mm of vertical compliance in a vertical direction measured at the wheel axle when encountering bumps.

5. The front fork assembly for a bicycle of claim 1, wherein the brake disc caliper is attached to the rigid front fork at a location horizontally in line with the wheel axle.

6. The front fork assembly for a bicycle of claim 1, wherein the brake disc caliper is attached to only one side of the front wheel.

* * * * *